J. V. BARGER.
GRASSHOPPER-DESTROYER.

No. 191,097. Patented May 22, 1877.

WITNESSES
Henry N. Miller
Frank Galt

INVENTOR
James V. Barger,
ATTORNEYS.

UNITED STATES PATENT OFFICE.

JAMES V. BARGER, OF ROCKPORT, MISSOURI.

IMPROVEMENT IN GRASSHOPPER-DESTROYERS.

Specification forming part of Letters Patent No. 191,097, dated May 22, 1877; application filed March 26, 1877.

*To all whom it may concern:*

Be it known that I, JAMES V. BARGER, of Rockport, in the county of Atchison, and in the State of Missouri, have invented certain new and useful Improvements in Grasshopper-Destroyer; and do hereby declare that the following is a full, clear, and exact description thereof, reference being had to the accompanying drawing, and to the letters of reference marked thereon, making a part of this specification.

The nature of my invention consists in the construction and arrangement of a machine for catching and destroying grasshoppers, as will be hereinafter more fully set forth.

In order to enable others skilled in the art to which my invention appertains to make and use the same, I will now proceed to describe its construction and operation, referring to the annexed drawing, in which—

Figure 1:
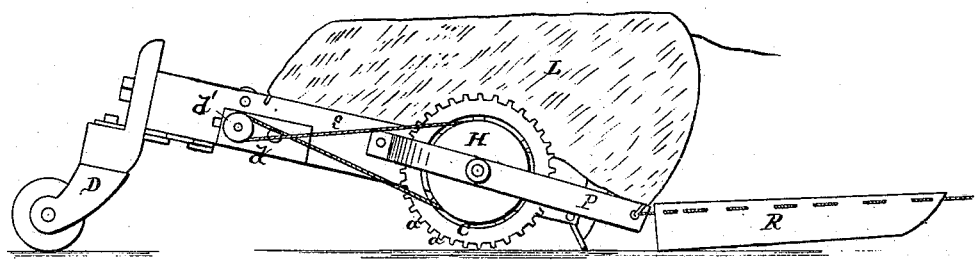
Figure 2:
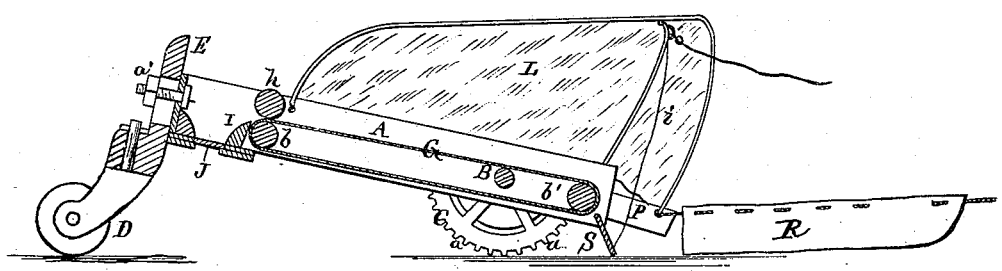

Figure 1 is a side elevation of my machine. Fig. 2 is a longitudinal vertical section of the same.

A represents the frame-work placed on an axle, B, to which the driving-wheels C C are secured. These wheels are formed with spurs $a$ to enter the ground so that they will rotate when the machine is drawn over the ground.

This axle, with its wheels, is near the front end of the frame, and the rear end of said frame is supported on a caster-wheel, D, the frame E of which is slotted vertically, and fastened by a bolt, $a'$, to the main frame, thus making the rear end of the main frame adjustable up and down on the caster-wheel.

The main frame A stands always in a more or less inclined position, and the bottom of the frame is formed of an endless apron, G, passing around two rollers, $b\ b'$.

The rear roller $b$ has its bearings in slides $d$, which can be adjusted at will, so as to stretch the apron as required. On one of the journals of the roller $b$, outside of the frame, is a pulley, $d'$, connected by a crossed belt or rope, $e$, with a pulley, H, attached to the wheel C, on that side of the machine, whereby the endless apron G obtains a rearward motion as the machine moves forward.

Above the rear roller $b$ is another roller, $h$, as shown, and in rear of these rollers is formed a box, I, with sliding bottom J.

Above the apron G is a hood, L, stretched on a wire frame attached to the main frame A. To each side of the main frame is fastened a forwardly-extending arm, P, and to these arms are connected wings R, to the front ends of which the horse is hitched.

At the front end of the apron G is a hinged apron, S, adjusted at any angle by means of a cord, $i$.

As the machine is moved forward the grasshoppers are guided or, so to say, scooped in by the wings R, hood L, and hinged apron S, onto the endless rotating apron G, and they are carried backward by said apron until they are crushed by the roller $h$, when they fall into the box I. This box, when full of dead grasshoppers, is emptied by simply drawing out the sliding bottom J.

Having thus fully described my invention, what I claim as new, and desire to secure by Letters Patent, is—

The hood L, hinged apron S, and wings R, in combination with the carrying-apron G, crushing-roller $h$, and receiving-box I, all substantially as and for the purposes herein set forth.

In testimony that I claim the foregoing I have hereunto set my hand this 1st day of February, 1877.

J. V. BARGER.

Witnesses:
T. C. GIFFORD,
F. M. CALDWELL.